3,709,895
PRODUCTION OF 5-METHYLENE-
2,4-OXAZOLIDINEDIONES
Reinhold Kohlhaupt, Frankenthal, and Friedrich Becke, Heidelberg, Germany, assignors to Badische Anilin- & Soda-Fabrik Aktiengesellschaft, Ludwigshafen (Rhine), Germany
No Drawing. Filed Sept. 16, 1970, Ser. No. 72,867
Claims priority, application Germany, Sept. 18, 1969, P 19 47 193.3
Int. Cl. C07d 85/34
U.S. Cl. 260—307 B    9 Claims

ABSTRACT OF THE DISCLOSURE

The production of 5-methylene-2,4-oxazolidinediones by cyclization of β-aminolactamideurethanes at elevated temperature, and the new 5-methylene-2,4-oxazolidinediones. The new compounds which can be prepared by the process according to the invention are fungicides and valuable starting materials for the production of dyes and pesticides.

---

The invention relates to a process for the production of 5-methylene-2,4-oxazolidinediones by cyclization of β-aminolactamideurethanes at elevated temperatures. The invention also relates to new substances of this type.

It is known that choralcyanohydrinphenylurethane can be converted by heating with acid into 5-dichloromethylene-3-phenyl-2,4-oxazolidinedione (Journal Chem. Soc. 1940, 1512). The production of the 5-methylene-2,4-oxazolidinediones bearing no substituents on the methylene radical has not hitherto been described.

One object of this invention is a new process for the production of new-5-methylene-2,4-oxazolidinediones in good yields and high purity.

Another object of this invention is the new 5-methylene-2,4-oxazolidinediones these and other objects are achieved and 5-methylene-2,4-oxazolidinediones having the general Formula I:

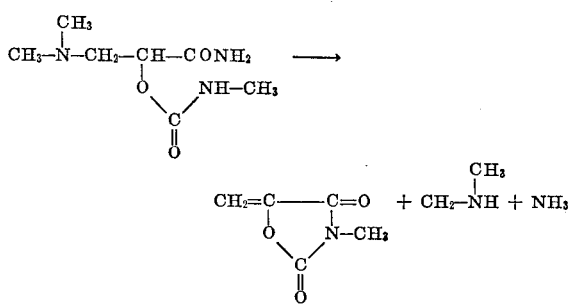

where $R^1$ denotes an aliphatic, cycloaliphatic, araliphatic or aromatic radical, are obtained advantageously by cyclizing, at a temperature of from 100° to 200° C., a β-aminolactamideurethane having the general Formula II:

$$R^2N-CH_2-CH-CONH_2$$
$$\underset{O}{|}\phantom{xx}\underset{O}{|}$$
$$O-C-NH-R^1$$
$$\parallel$$
$$O$$

(II)

where $R^1$ has the meanings given above and the individual radicals $R^2$ may be identical or different and each denotes an aliphatic or cycloaliphatic radical, at a temperature of from 100° to 200° C.

When β - dimethylaminolactamidemethylurethane is used, the reaction may be represented by the following equation:

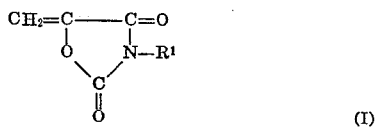

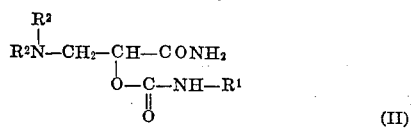

The process according to the invention yields a large number of new 5-methylene-2,4-oxazolidinediones in a simple way and in good yields and high purity.

The starting materials (II) may be prepared by reaction of appropriate β-aminolactamides with isocyanates. Preferred starting materials (II) and consequently preferred end products (I) are those in which $R^1$ denotes an alkyl radical having 1 to 8 carbon atoms, alkenyl radical having 2 to 8 carbon atoms, a cycloalkyl radical having 5 or 6 carbon atoms, an aralkyl radical having 7 to 12 carbon atoms or a phenyl radical, and the individual radicals $R^2$ may be identical or different and each denotes an alkyl radical having 1 to 8 carbon atoms or a cycloalkyl radical having 5 to 6 carbon atoms.

The following are examples of suitable starting materials (II):

β-dimethylaminolactamide-N'-methylurethane,
β-diethylaminolactamide-N'-methylurethane,
β-dicyclohexylaminolactamide-N'-methylurethane and
β-methylethylaminolactamide-N'-methylurethane and also the corresponding N'-n-butylurethanes,
N'-p-chlorophenylurethanes,
N'-n-octylurethanes,
N'-cyclopentylurethanes and
N'-benzylurethanes.

The reaction is carried out at a temperature of from 100° to 200° C., preferably from 120° to 160° C. at atmospheric, superatmospheric or preferably subatmospheric pressure, continuously or batchwise. Advantageously, a pressure of less than 50 mm. is used. If desired solvents which are inert under the reaction conditions may be used such as water; acid amides bearing two substituents on the nitrogen atom such as N-methylpyrrolidone, dimethyl formamide; ethers such as ethylene glycol dimethyl ether, diethyl ether; dimethyl sulfoxide; or appropriate mixtures, advantageously of water and one of the abovementioned organic solvents.

The reaction may be carried out as follows: The starting material, with or without a solvent, is kept for one to four hours at the reaction temperature. The end of the reaction can be detected as a rule by the fact that elimination of amine or ammonia can no longer be observed. The end product is isolated from the reaction mixture by a conventional method, for example by fractional distillation with or without recrystallization of the distillation residue. An advantageous embodiment consists in carrying out the reaction in a vacuum distillation vessel, the 5-methylene-2,4-oxazolidinedione being distilled off as it is formed. The eliminated amine may be condensed and used again for the production of starting material (II).

The new compounds which may be prepared according to the invention are valuable fungicides and valuable starting materials for the production of dyes and pesticides. Thus for example 3-methyl-5-methylene-2,4-oxazolidinedione used in a concentration of only 10 p.p.m. or 3-butyl-5-methylene-2,4-oxazolidinedione used in concentration of only 25 p.p.m. have a good fungicidal action on *Aspergillus niger*.

The invention is illustrated by the following examples in which the parts referred to are parts by weight.

EXAMPLE 1

5-methylene-3-methyl-2,4-oxazolidinedione (a) In a stirred vessel with vacuum distillation 189.3 parts of β-dimethylaminolacetamidemethylurethane is heated at 30 mm. over a period of thirty minutes up to 130° to 140° C.; thermal reaction of the urethane and distillation of the end product formed begin at about 120° C. After an hour, the reaction is over. The distillate begins to solidify during distillation, 92.5 parts (74.4% of the theory) of 5-methylene-3-methyl-2,4-oxazolidinedione having a melting point of from 80° to 81° C. is obtained.

(b) 273.4 parts of β-dibutylaminolactamidemethylurethane is dissolved in 1000 parts of N-methylpyrrolidone. The solution obtained is heated for two hours at 140° C. Elimination of dibutylamine and ammonia is then complete.

After the solvent has been distilled off in vacuo, the distillation residue is recrystallized from methanol. 79.4 parts (62.3% of the theory) of 5-methylene-3-methyl-2,4-oxazolidinedione is obtained having a melting point of from 80° to 81° C.

EXAMPLE 2

5-methylene-3-(n-butyl)-2,4-oxazolidinedione 259.3 parts of β-diethylaminolactamide-n-butylurethane is thermally treated as described in Example 1(a). 132.5 parts of crude end product distils over.

Redistillation gives 101.1 parts (60.4% of the theory) of 5-methylene-3-(n-butyl)-2,4-oxazolidinedione having a boiling point of 81° to 83° C. at 1 mm. $n_D^{20}$: 1.4762.

EXAMPLE 3

5-methylene-3-cyclohexyl-2,4-oxazolidinedione 285.4 parts of β-diethylaminolactamidecyclohexylurethane is heated at 150° C. for ninety minutes as described in Example 1(a). 166.8 parts of crude end product distils over. After fractionation, 1360.6 parts (69.7% of the theory) of 5-methylene-3-cyclohexyl-2,4-oxazolidinedione is obained having a melting point of 1300° to 135° C. at 2 mm.

EXAMPLE 4

5-methylene-3-allyl-2,4-oxazolidinedione 243.1 parts of β-diethylaminolactamideallylurethane is thermally treated as described in Example 1(a). 121.5 parts of crude end product distils over. By fractionation, 95.3 parts (62.2% of the theory) of 5-methylene-3-allyl-2,4-oxazolidinedione is obtained having a boiling point of 72° to 74° C' $n_D^{20}$: 1.4962.

EXAMPLE 5

5-methylene-3-(p-chlorophenyl)-2,4-oxazolidinedione 313.8 parts of β-diethylaminolactamide-p-chlorophenyl-urethane is heated for ninety minutes at 160° C. as described in Example 1(a). The end product distils over. 113.3 parts (51.7% of the theory) of 5-methylene-3-(p-chlorophenyl)-2,4-oxazolidinedione is obtained having a melting point of 68° C.

We claim:

1. A process for the production of 5-methylene-2,4-oxazolidinediones having the formula:

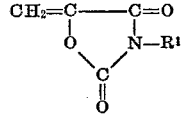

(I)

where $R^1$ denoes alkyl of 1 to 8 carbon atoms, alkenyl of 2 to 8 carbon atoms, cycloalkyl of 5 or 6 carbon atoms, benzyl or phenyl, which comprises cyclizing at a temperature of from 100° to 200° C. a β-aminolactamideurethane having the formula:

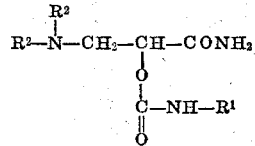

(II)

where $R^1$ has the meanings given above and the individual radicals $R^2$ may be identical or different and each denotes alkyl of 1 to 8 carbon atoms or cycloalkyl of 5 to 6 carbon atoms.

2. A process as claimed in claim 1 wherein cyclization is carried out at from 120° to 160° C.

3. A process as claimed in claim 1 wherein cyclization is carried out at a pressure of less than 50 mm.

4. A process as claimed in claim 1 wherein cyclization is carried out in the presence of an inert solvent.

5. A 5-methylene-2,4-oxazolidinedione having the formula:

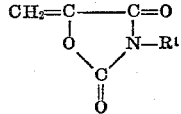

where $R^1$ denotes alkyl of 1 to 8 carbon atoms, alkenyl of 2 to 8 carbon atoms, cycloalkyl of 5 or 6 carbon atoms, benzyl or phenyl.

6. An oxazolidinedione as claimed in claim 5 wherein $R^1$ is alkyl of 1 to 8 carbon atoms.

7. n oxazolidinedione as claimed in claim 5 wherein $R^1$ is allyl.

8. An oxazolidinedione as claimed in claim 5 wherein $R^1$ is cyclohexyl.

9. A 5-methylene-2,4-oxazolidinedione having the formula:

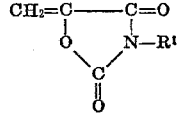

where $R^1$ is chlorophenyl.

References Cited

UNITED STATES PATENTS 3,280,136   10/1966   Finkbeiner _____ 260—299

ALTON D. ROLLINS, Primary Examiner

R. V. RUSH, Assistant Examiner

U.S. Cl. X.R.

424—272